United States Patent
Waechter et al.

(10) Patent No.: US 6,300,977 B1
(45) Date of Patent: Oct. 9, 2001

(54) READ-OUT CIRCUIT FOR ACTIVE MATRIX IMAGING ARRAYS

(75) Inventors: David Waechter, Hawkesbury; Zhong Shou Huang, Etobicoke, both of (CA)

(73) Assignee: iFire Technology Inc. (CA)

( * ) Notice: Subject to any disclaimer, the term of this patent is extended or adjusted under 35 U.S.C. 154(b) by 0 days.

(21) Appl. No.: 08/930,749
(22) PCT Filed: Apr. 7, 1995
(86) PCT No.: PCT/CA95/00202
  § 371 Date: Dec. 2, 1997
  § 102(e) Date: Dec. 2, 1997
(87) PCT Pub. No.: WO96/31976
  PCT Pub. Date: Oct. 10, 1996

(51) Int. Cl.[7] .................................................. H04N 3/14
(52) U.S. Cl. ........................ 348/300; 348/302; 348/304
(58) Field of Search .................................... 348/301, 302, 348/303, 304, 305, 308; 378/98.8; 250/208.1

(56) References Cited

U.S. PATENT DOCUMENTS

| 5,063,449 | * | 11/1991 | Shibata et al. | 348/302 |
| 5,132,820 | * | 7/1992 | Someya et al. | 349/38 |
| 5,151,689 | * | 9/1992 | Kabuto et al. | 349/42 |
| 5,401,952 | * | 3/1995 | Sugawa | 348/302 |
| 5,406,332 | * | 4/1995 | Shinohara et al. | 38/308 |
| 5,408,252 | * | 4/1995 | Oki et al. | 349/48 |
| 5,539,461 | * | 7/1996 | Andoh et al. | 348/308 |

OTHER PUBLICATIONS

A large area solid–state detector for radiology using amorphous selenium Medical Physics Research, Sunnybrook Health Science Centre, Toronto, Canada.
Demonstration of megavoltage and diagnostic x–ray imaging with hydrogenated amorphous silicon arrays Med. Phys. 19 (6) Nov./Dec. 1992.

* cited by examiner

Primary Examiner—Wendy R. Garber
Assistant Examiner—Mitchell White
(74) Attorney, Agent, or Firm—Fay, Sharpe, Fagan, Minnich & McKee, LLP

(57) ABSTRACT

Improved circuitry for active matrix image arrays which, in one application reduces the number of source or gate lines for a given number of pixels, and in another application extends the dynamic range of the imaging array without reducing the number of source or gate lines. Each circuit includes multiple electrodes per pixel and multiple thin film transistors for switching charge from the pixel electrodes to the data line.

7 Claims, 8 Drawing Sheets

READ-OUT CIRCUIT FOR ACTIVE MATRIX IMAGING ARRAYS

FIELD OF THE INVENTION

This invention relates in general to imaging arrays, and more particularly to improved read-out circuitry which, in one application, reduces the number of source or gate lines in the array, and in another application increases the dynamic range for read-out without reducing the number of source or gate lines.

BACKGROUND OF THE INVENTION

Imaging arrays are known in the art which comprise a transducer for either directly converting incident radiation to electrical charges, or for converting incident radiation to light energy (i.e. photons) and then converting the light energy to electrical charges. It is also known in the art to connect an active matrix read-out array to such prior art transducers, for collecting charges generated by the transducer onto individual pixels of the active matrix array, and then reading out the pixel charges on a row-by-row basis. The charge signals read out of the array are then measured using charge amplifiers connected to each source or data line. Examples of such prior art systems are disclosed in W. Zhao and J. A. Rowlands, "A Large Area Solid-State Detector for Radiology Using Amorphous Selenium", in Medical Imaging VI: Instrumentation, SPIE 1651, 134, (1992), and in L. E. Antonuk, J. Boudry, W. Huang, D. L. McShan, E. J. Morton, J. Yorkston, M. J. Longo and R. A. Street, "Demonstration of Megavoltage and Diagnostic X-ray Imaging with Hydrogenated Amorphous Silicon Arrays", Med. Phys. 19, 1455 (1992).

One disadvantage of prior art active matrix readout arrays is that each pixel is connected to a source line and a gate line of the associated switching transistor (e.g. thin film transistor (TFT)). This effectively reduces the fill factor for each pixel, unless an additional insulating layer is placed between the source lines or gate lines and the pixel electrodes.

Another disadvantage of prior art active matrix readout arrays is that it can be difficult and occasionally impossible to bond the arrays to external chips, when the gate our source line pitch is very small. Bonding technology is the main limiting factor in certain applications like mammography, where a pixel pitch as small as 50 microns is required. In mammography it is not possible to reduce the problem by bonding chips to every second line on both sides, since the active area on at least one side should be as close as possible to the chest wall and should not be bonded.

A further disadvantage of prior art active matrix readout arrays is that the charge amplifier design for such prior art arrays usually suffers from a trade-off between sensitivity and dynamic range. In particular, where a charge amplifier has been designed for high sensitivity in a prior art active matrix read-out array, such an amplifier is not capable of measuring large signals due to saturation of the response.

SUMMARY OF THE INVENTION

According to the present invention, circuitry is provided which, in one application, is capable of reducing by half the number of source lines or gate lines in an active matrix read-out array, and which, in another application, maintains the usual number of source lines and gate lines, but is capable of extending the dynamic range of the charge amplifiers. By reducing the number of source lines and gate lines, the circuitry of the present invention enjoys substantially increased fill factor on a per-pixel basis than prior art designs. The circuitry of this invention also increases the pitch of the gate or data lines, so that fewer channels are required in the peripheral gate drivers or charge amplifiers and fewer wire bonds to these external devices are needed. This results in lower cost and improved reliability and the ability to provide higher resolution within a given bond pitch constraint. On the other hand, when the circuitry of the present invention is operated using the usual number of source and gate lines, extended dynamic range is provided over the prior art while maintaining high sensitivity of the charge amplifiers.

BRIEF DESCRIPTION OF THE DRAWINGS

A detailed description of exemplary embodiments of the invention is provided below with reference to the following drawings, in which.

DETAILED DESCRIPTION OF THE PREFERRED EMBODIMENT AND OF THE PRIOR ART

Figure 1:
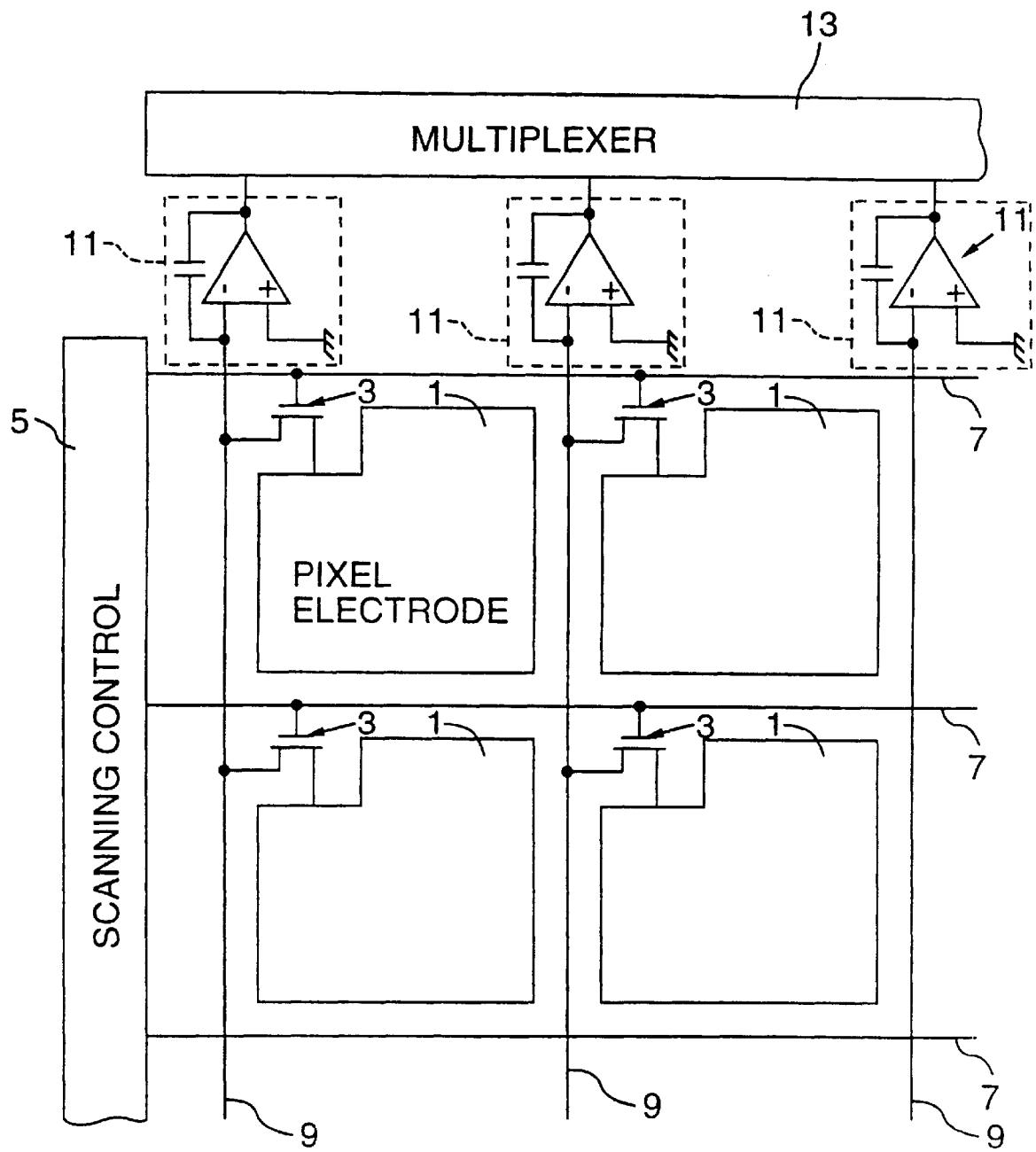
FIG. 1 is a block schematic diagram of an active matrix read-out circuit for a radiation imaging device in accordance with the prior art.

In FIGS. 1–5, common reference numerals are used to denote circuit elements common to each of the Figures.

FIG. 1 shows an active matrix circuit for a radiation imaging device, according to the prior art. In this device, a transducer (not shown) converts electromagnetic radiation into charge signal. The transducer can be, for example, a relatively thick (e.g. 500 $\mu$m) layer of amorphous selenium (a-Se) across which a high voltage may be applied between a top electrode on one side of the a-Se layer and the pixel electrodes 1 on the opposite side. Electron-hole pairs are generated in the a-Se layer in response to incident radiation, and the charges move toward the two electrodes under the influence of an electric field established by the high voltage.

The charge deposited on pixel electrodes 1 is then read out on a row-by-row basis by means of an array of thin film transistors (TFTs 3). Successive rows of pixel electrodes 1 are scanned in response to scanning control circuit 5 applying a scanning pulse to gate lines 7, to which the gate electrodes of successive rows of TFTs 3 are connected. Charges stored on each of the scanned rows of pixel electrodes 1, are applied to adjacent source or data lines 9 via the drain-source signal path through the associated TFTs 3. This signal is measured using charge amplifiers 11 connected to respective data or source lines 9. The charge amplifiers 11 may be of standard well known design. A multiplexer 13 is used to select successive outputs of the charge amplifiers 11. Additional A/D conversion circuitry (now shown) is provided to convert the sensed charges to digital signals for further processing, display, etc.

As discussed above, the occupancy of the source or data lines 9 reduces the fill factor of each pixel in such prior art designs, unless an additional insulating layer is placed between the source lines and the pixel electrodes 1. Furthermore, the charge amplifiers 11 for such prior art read-out matrices, usually suffer from a trade-off between sensitivity and dynamic range since a charge amplifier which has been designed for high sensitivity cannot measure large signals due to saturation of the response. Also, many wire bond connections must be made between the pixel array and the scanning control and charge amplifier circuits (usually silicon integrated circuits).

Figure 2A:
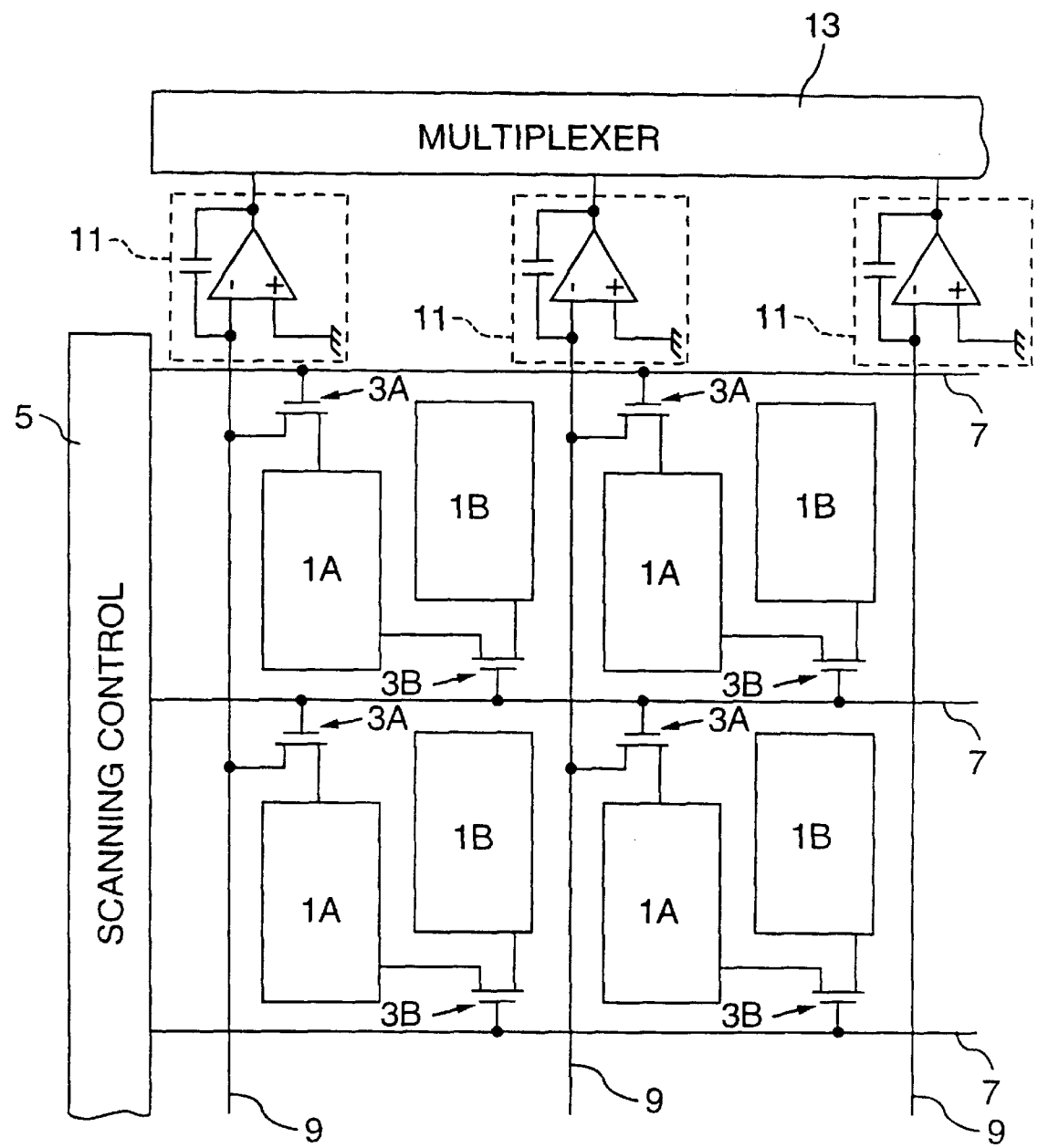
FIG. 2A is a block schematic diagram of an active matrix read-out circuit with reduced number of source lines per pixel, according to a first embodiment of the invention.

Turning now to FIG. 2A, a first embodiment of the circuitry according to the present invention is shown. In this embodiment, two pixel electrodes are provided for each space normally occupied by a single pixel in the prior art. First pixel electrode 1A is connected to source line 9 via first TFT 3A, the gate input of which is connected to a first one of the control lines 7 on one side of the pixel. A second pixel electrode 1B is connected to first pixel electrode 1A via second TFT 3B, the gate input of which is connected to the other control line 7 for the pixel.

In operation, after radiation-induced charge has been deposited on pixel electrodes 1A and 1B, the gate lines 7 are sequentially scanned, starting at the top and moving down. When each row 7 is addressed for the first time, the charge carried on pixel electrodes 1A is read out through the TFTs 3A. The read-out process momentarily leaves pixel electrodes 1A free of charge. When the row immediately below is addressed, part of the charge carried by pixel electrodes 1B is transferred to the pixel electrodes 1A, through TFTs 3B. This charge is then read out when TFTs 3A are activated during the second successive scan of gate lines 7.

On the first successive scan of the gate lines 7, the transfer of charge from pixel electrodes 1B to 1A is incomplete. Consequently, the signal derived from the pixel electrodes 1B in the second sequential scan of gate lines 7, must be multiplied by a suitable correction factor. In particular, the ratio of the total charge initially induced on pixel 1B to the charge measured on the second scan, is given by (C1A+C1B)/C1A, where C1A and C1B are the storage capacitances of pixels 1A and 1B, respectively.

In order to completely clear the charge from pixel electrodes 1B, many successive scans of the gate lines 7 must be performed. Each scan effectively sub-divides the remaining charge between the 1A and 1B pixel electrodes, with the component of charge on pixel electrodes IA being cleared with each scan. As an alternative, a more effective clearing procedure can be implemented by activating all gate lines 7 simultaneously.

According to a further alternative addressing scheme, pixels 1A are first read by successively addressing gate lines 7 as discussed above, from the top row down. The charge originally on the pixels 1B which is thereby redistributed between the pixels 1A and 1B is then read-out by simultaneously addressing adjacent gate lines 7 (i.e. two at a time), starting from the bottom and moving up. This allows the original charge on the pixels 1B to be read out completely, without the need for any multiplication factor.

The circuit of FIG. 2A can also be used to extend the dynamic range for charge read-out without changing the number of pixels per source line. In this case, pixel electrodes 1B are made smaller than pixel electrodes 1A and are placed sufficiently close to pixel electrodes 1A as to effectively sample the same radiation induced charge. Suitable area ratios 1A/1B could be anywhere from about 2 to 20. In this case, pixel electrodes 1A and 1B are considered to be components of the same pixel. On the first scan of gate lines 7, the charges deposited on pixel electrodes 1A are read out. For some of the pixels, this charge may be enough to saturate the associated charge amplifiers 11. On the second scan of successive rows 7, the charge from the smaller pixel electrodes 1B are sampled, which, in most cases, does not result in saturation of the associated charge amplifiers 11. For those pixels which saturate the charge amplifiers 11 on the first scan, data from the second scan, multiplied by a suitable factor, is used. In rare instances, the signals on some pixels might be large enough to saturate the charge amplifiers 11 even on the second scan. In such cases, a third or fourth scan can be used to further sub-divide the remaining charge until it is reduced to a measurable level.

Figure 3A:
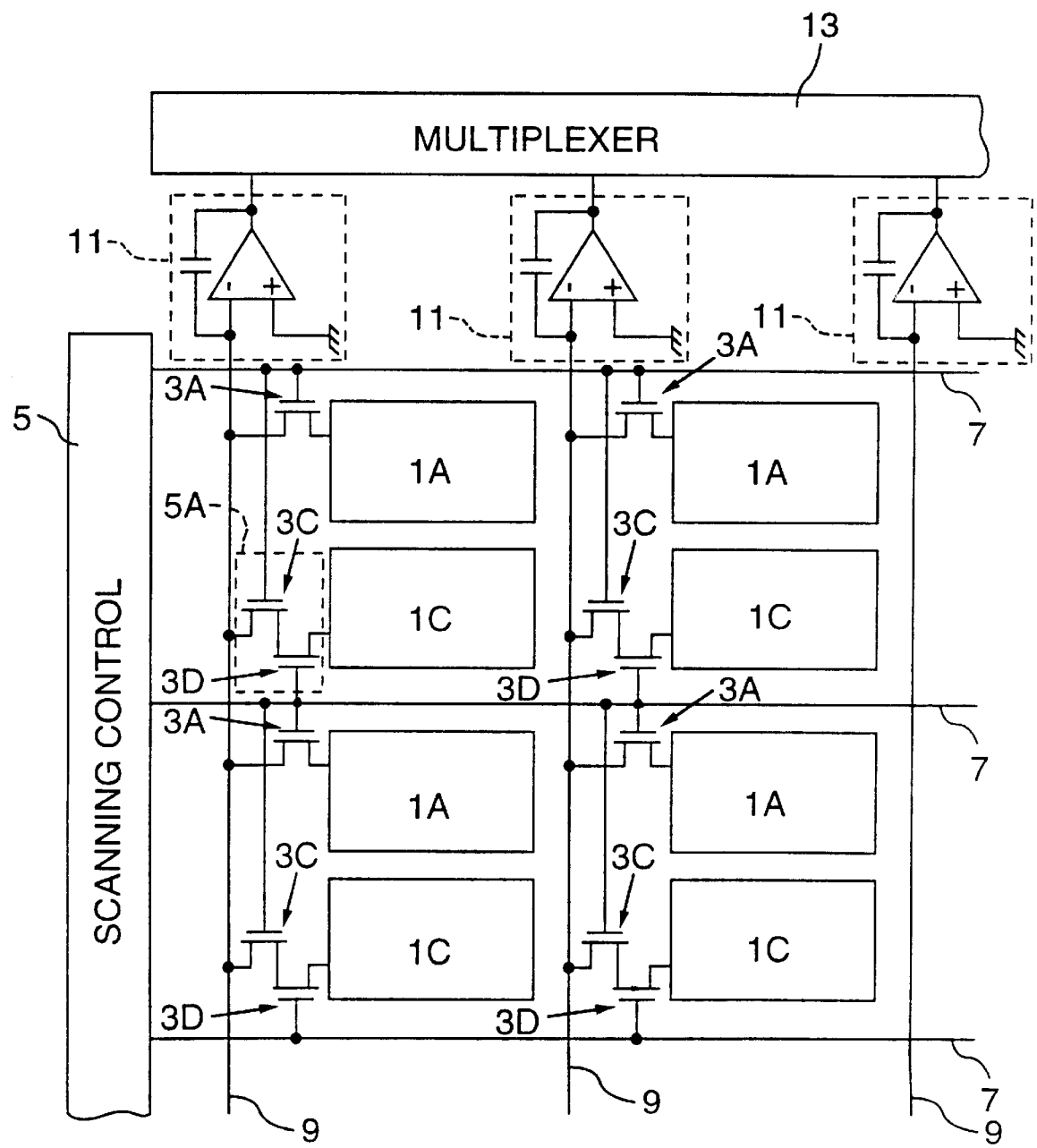
FIG. 3A is a block schematic diagram of an active matrix read-out circuit with reduced number of gate lines per pixel, in accordance with a second embodiment of the invention.
Figure 3B:
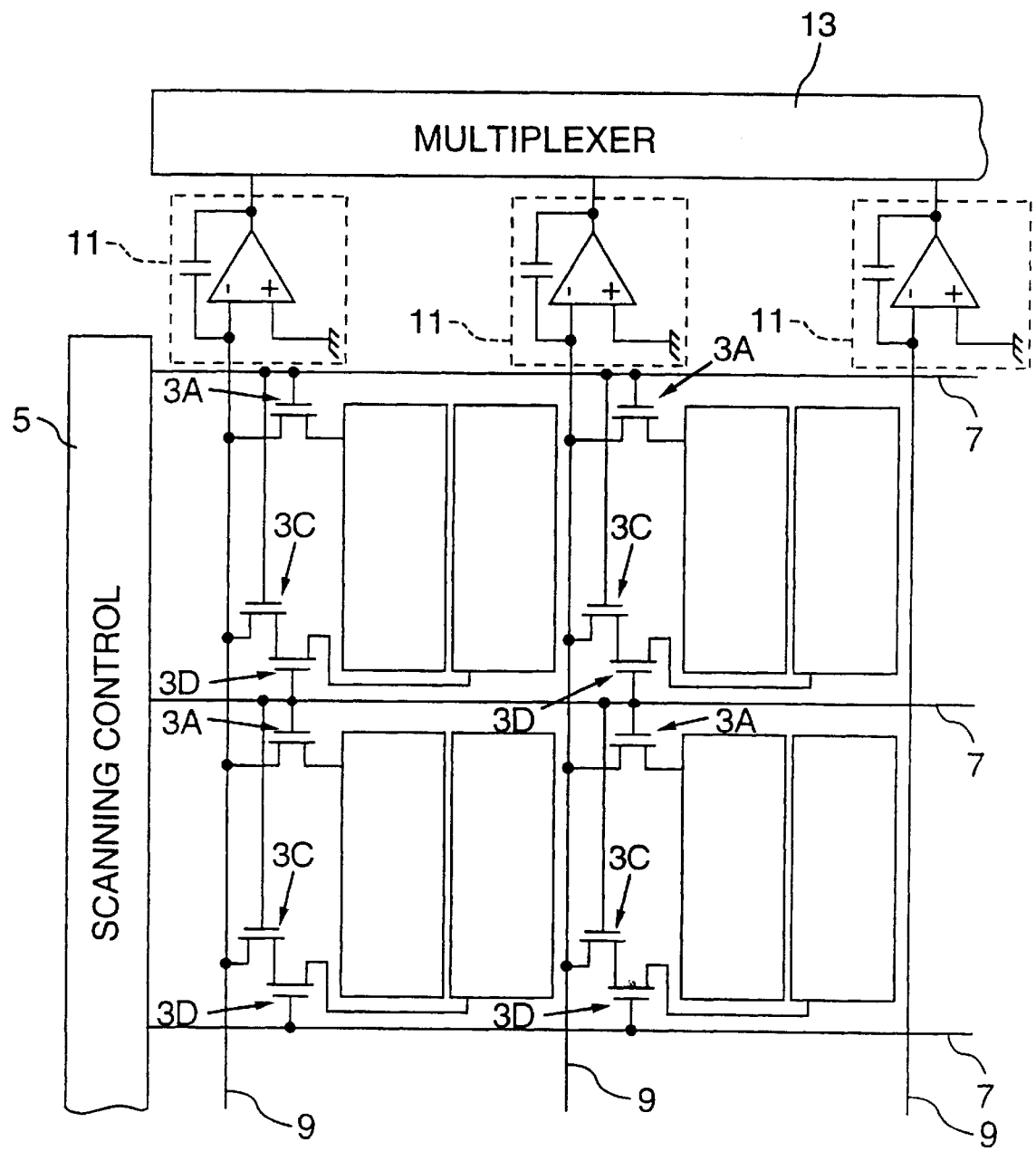
FIG. 3B is a block schematic diagram of an alternative to the second embodiment shown in FIG. 3A.

Turning now to FIG. 3A, a second embodiment of the invention is shown in which a given number of pixels are addressed using only half the usual number of gate lines.

In this embodiment, pixel electrodes 1A are connected to source lines 9 as discussed above with reference to FIG. 2. Second pixel electrodes 1C are also connected to source lines 9, via series-connected TFTs 3C and 3D, the gate input of TFT 3C being connected to the top gate line or control line 7, while the gate input of TFT 3D is connected to the bottom control line or gate line 7.

In operation, the charge deposited on pixel electrodes 1A are read out by activating gate lines 7 one row at a time, in the usual manner. During this process, the charges on pixel electrodes 1C are not disturbed since at least one of the two TFTs 3C and 3D will be off for each pixel. The charges on pixel electrodes 1C are read out only after reading pixel electrodes 1A, by activating two adjacent gate lines 7 simultaneously.

The circuit of FIG. 3A can also be used to extend the dynamic range in a similar manner as discussed above with reference to FIG. 2A. In this application, the pixel electrodes 1C are made smaller than pixel electrodes 1A and are placed very close to them, so as to effectively sample the same radiation induced charge. The signals from pixel electrodes 1A are normally used upon sequential scanning, unless saturation of the associated charge amplifiers 11 occurs. In the latter case, the signals from the smaller electrodes 1C, multiplied by a suitable correction factor, are used. With this circuit, only one level of dynamic range extension is possible since the charges on pixel electrodes 1C are read out completely, rather than being sub-divided on subsequent scans as in the embodiment of FIG. 2A.

Figure 2B:
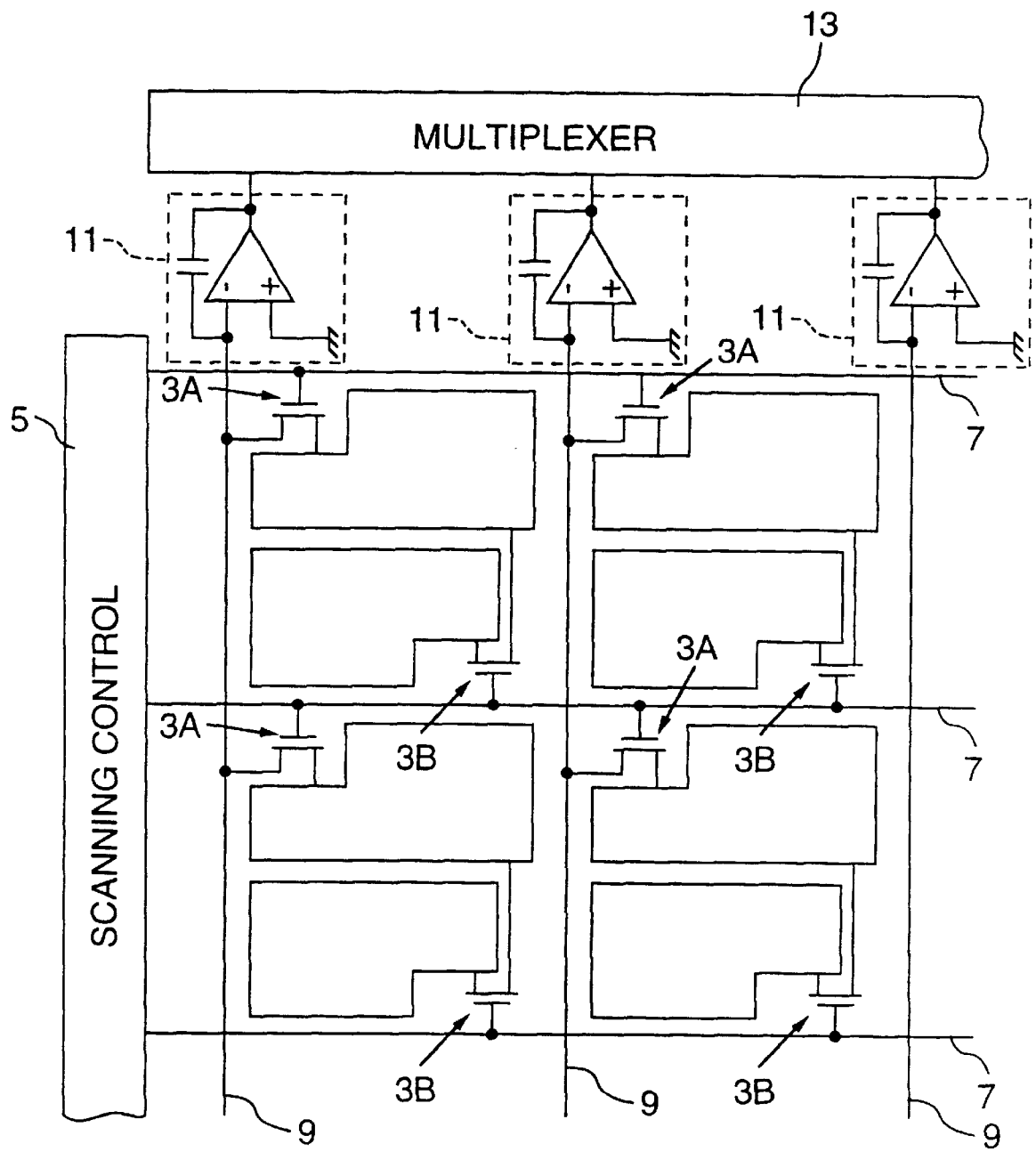
FIG. 2B is a block schematic diagram of an alternative to the first embodiment shown in FIG. 2A.

Alternatives to the embodiments shown in FIGS. 2A and 2B are possible. For example, in FIG. 2A the pixels are located to the right of pixels 1A and the number of source lines per pixel is reduced. However, this can be easily rearranged so that the pixels 1B are located beneath the pixels 1A as shown in FIG. 2B, and reconfigured to increase the fill factor while still reducing the number of source lines per pixel. Likewise in FIG. 3B, the pixels 1C are shown disposed to the right of the pixels 1A, and with dimensions selected to increase fill factor the number of source lines per pixel, rather than the number of gate lines per pixel as in FIG. 3A.

Figure 4:
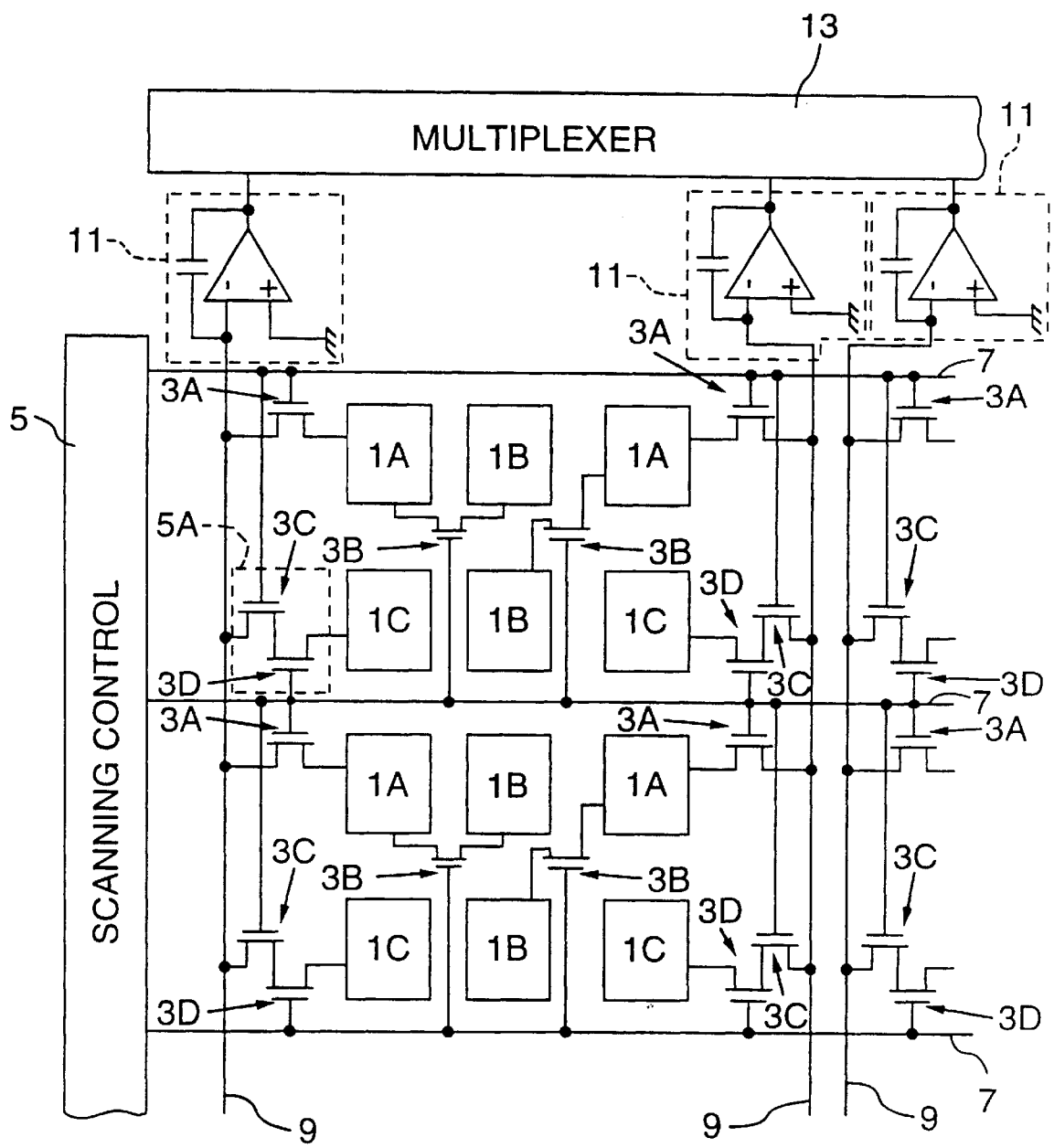
FIG. 4 is a block schematic diagram of an active matrix read-out circuit with reduced number of source and gate lines per pixel, according to a third embodiment of the invention.

The circuits of FIGS. 2 and 3 can be combined to reduce both the number of source lines per pixel and the number of gate lines per pixel, as shown in FIG. 4. In this circuit, pixel electrodes 1A are read first by sequentially scanning the gate lines 7 from the top down. The main portion of charge on pixel electrodes 1B is read next by again sequentially scanning the gate lines 7, from the top down. Finally, pixel electrodes 1C are read by simultaneously addressing adjacent pairs of gate lines 7. The charge measured during this last step will contain a remnant of charge from pixel electrodes 1B. However, since the magnitude of this charge is known from the previous step of charge calculation, an equivalent amount can be subtracted from the charge sensed in this last step by post processing.

Figure 5A:
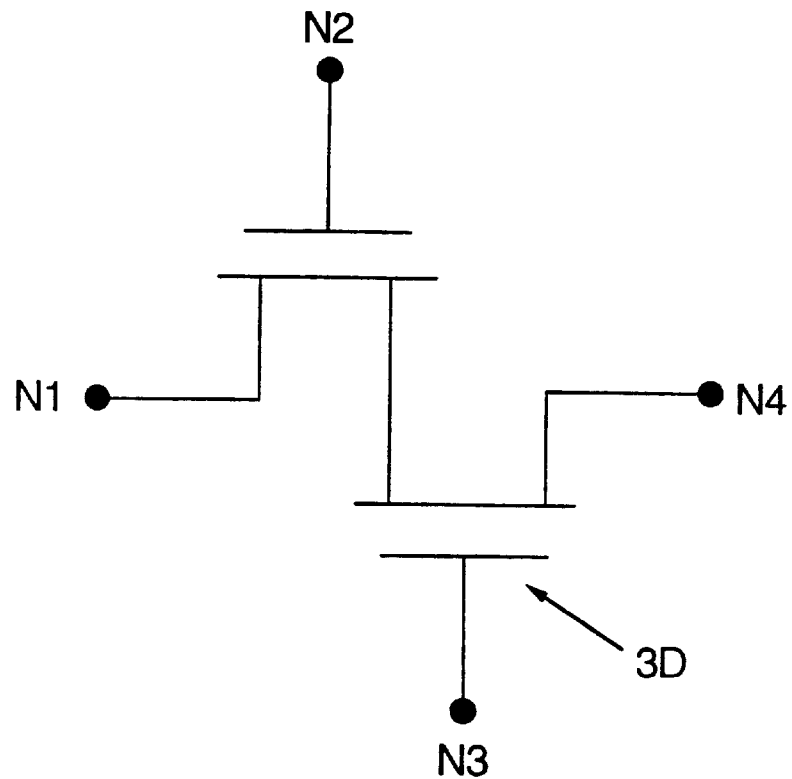
FIG. 5a is a schematic diagram of a portion of the FIG. 3 and FIG. 4 circuits shown in dashed outline.
Figure 5B:
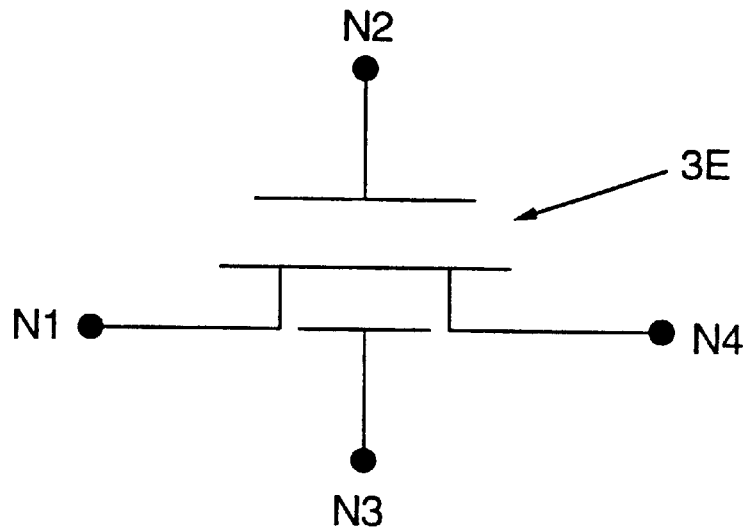
FIG. 5b is an alternative embodiment of said portion.

In the circuits of FIGS. 3 and 4, the two transistors 3C and 3D may be replaced by a single thin film transistor having both upper and lower gates. Transistors 3C and 3D, and their alternative dual gate embodiments are shown in FIG. 5a and 5b, respectively. The alterative embodiment provides an improved fill factor by reducing the number of transistors. In the alternative embodiment, the gate voltage levels for the ON and OFF state must be chosen so that transistor 3E is ON only if both upper and lower gates have ON voltages applied thereto. In the alternative embodiment, transistors 3A and 3B can be either single gate devices or dual date devices, with upper and lower gates connected together.

Figure 6:
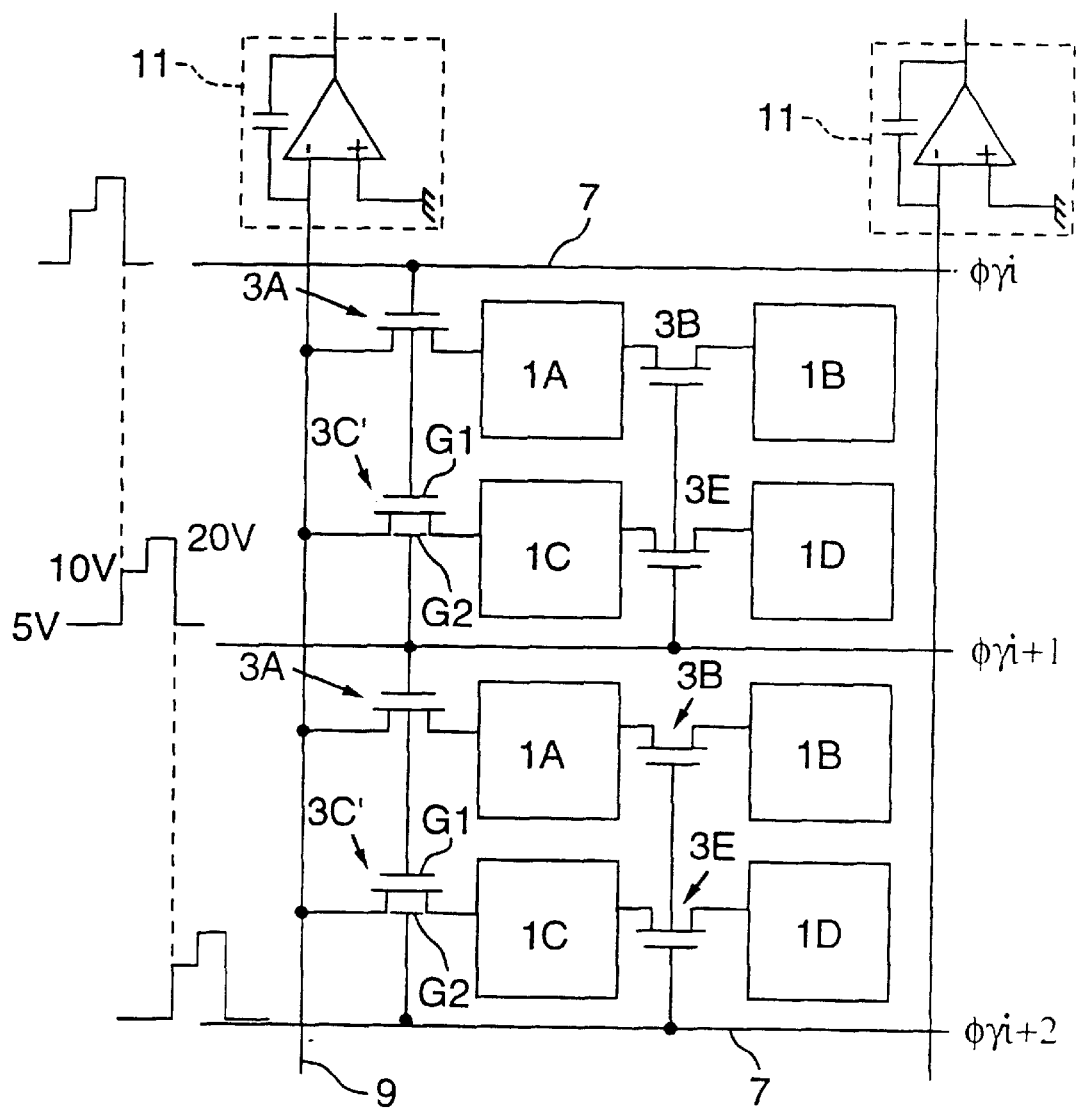
FIG. 6 is a schematic diagram of an active matrix read-out circuit with reduced number of source and gate lines per pixel, according to a fourth embodiment of the invention.

Turning now to the alternative embodiment of FIG. 6, a fourth pixel electrode 1D is provided for each pixel, this pixel electrode being connected to pixel electrode 1C via a further TFT switching transistor 3E. In this embodiment, TFT switching transistor 3C' is fabricated as a dual gate device with top and bottom gates identified as G1 and G2, wherein the top gate is physically located above the channel and the bottom gate is located below the channel. In operation, the control lines 7 are successively scanned with a two level waveform, as shown in the left hand portion of FIG. 6. For each control line 7 being scanned, a medium level gate voltage is first applied (e.g. 10 volts from a nominal OFF value of −5 volts), which causes the charge collected on pixels 1A to be read-out and cleared. The charges on pixels 1C are not transferred at this stage because the medium level gate voltage is insufficient to enable transistor 3C' while gate G2 is set to an OFF (i.e. −5 volts) voltage. The control pulse is then increased to a high level (e.g. 20 volts), which is sufficient to enable transistor 3C' so that the charge on pixels 1C is read-out, even though the low voltage (e.g −5 volts) is still applied to gate G2.

This medium-high pulse transition is applied successively to respective control lines 7, preferably from the top down. During addressing of a subsequent row, a portion of the charge originally deposited on the pixels 1B is transferred to the pixels 1A, and a portion of the charge originally deposited in the pixels 1D is transferred to the pixels 1C. These transferred charges are then read-out using a second scan of medium-high pulse transitions, again from the top down.

In order to avoid unwanted mixing of charges, the transistors 3C' are designed so that they turn on with a high voltage applied to gate G1 when a low voltage is applied to gate G2, but are disabled as long as a low voltage is applied to gate G1. This characteristic of the transistors 3C' is obtained by insuring that the gate G1 spans the entire length of the channel, while the gate G2 spans only a portion of the channel.

The embodiment of FIG. 6 reduces both the number of gates per pixel and the number of source lines per pixel.

In summary, according to the present invention, a versatile charge read-out matrix is provided which is capable in one application of significantly increasing the pixel fill factor by reducing the number of source lines and gate lines by one half over known prior art designs. In another application, the same circuits are capable of extending the dynamic range of the output charge amplifiers without compromising sensitivity.

Alternative embodiments and modifications of the invention are possible without departing from the sphere and scope of the invention as defined by the claims appended hereto.

The embodiments of the invention in which an exclusive property of privilege is claimed are defined as follows:

1. A method of operating an imaging array including a plurality of pixels arranged in rows and columns, each of said pixels being bounded by at least one data line and at least two control lines connected to a scanning control circuit, and each of said pixels including at least two pixel electrodes and at least two switching means, a first one of said pixel electrodes being connected to said at least one data line via a first one of said switching means, said first one of said switching means having a control input thereof connected to a first one of said control lines for receiving a first scanning pulse from said scanning control circuit for transferring charge on said first one of said pixel electrodes to said at least one data line, a second one of said pixel electrodes being connected to said first one of said pixel electrodes via a second one of said switching means, said second one of said switching means having a control input thereof connected to a second one of said control lines for receiving a second scanning pulse from said control circuit for transferring charge on said second one of said pixel electrodes to said first one of said pixel electrodes after said charge on said first one of said pixel electrodes has been transferred to said at least one data line, the method comprising the steps of:

a) scanning successive ones of said control lines such that for each of said pixels charge carried by said first one of said pixel electrodes is transferred to said at least one data line in response to scanning said first one of said at least two control lines, and a portion of charge carried by said second one of said pixel electrodes is transferred to said first one of said pixel electrodes in response to scanning said second one of said control lines;

b) scanning successive ones of said control lines a second time such that said portion of charge transferred from said second one of said pixel electrodes to said first one of said pixel electrodes is transferred to said at least one data line; and c) multiplying said portion of charge transferred to said at least one data line by a correction factor proportional to capacitance ratio between said first and second pixel electrodes, whereby each of said pixels functions as a pixel pair defined by said first and second pixel electrodes.

2. The method of claim 1, further comprising the steps of repeatedly further scanning successive ones of said control lines for clearing charge from said second one of said pixel electrodes.

3. The method of claim 1, further comprising the step of simultaneously scanning all of said control lines for clearing charge from said second one of said pixel electrodes.

4. In an imaging array comprising a plurality of pixels arranged in rows and columns, each of said pixels being bounded by at least one data line and at least two control lines connected to a scanning control circuit, the improvement wherein each of said pixels comprises at least two pixel electrodes and at least two switching means, a first one of said pixel electrodes being connected to said at least one data line via a first one of said switching means, said first one of said switching means having a control input thereof connected to a first one of said control lines for receiving a first scanning pulse from said scanning control circuit for transferring charge on said first one of said pixel electrodes to said at least one data line, a second one of said pixel electrodes being connected to said first one of said pixel electrodes via a second one of said switching means, said second one of said switching means having a control input thereof connected to a second one of said control lines for receiving a second scanning pulse from said control circuit for transferring charge on said second one of said pixel electrodes to said first one of said pixel electrodes after said charge on said first one of said pixel electrodes has been transferred to said at least one data line; and wherein each of said switching means further comprises a thin-film-transistor (TFT), and each said thin-film-transistor (TFT) is a dual gate device.

5. The improvement of claim 4, wherein a source terminal of said first switching means is connected to said at least one data line, a gate terminal of said first switching means is connected to said first one of said control lines, and a drain terminal of said first switching means is connected to said first one of said pixel electrodes.

6. The improvement of claim 4, wherein a source terminal of said second switching means is connected to said first one of said pixel electrodes, a gate terminal of said second switching means is connected to said second one of said control lines, and a drain terminal of said second switching means is connected to said second one of said pixel electrodes.

7. A method of operating an imaging array including a plurality of pixels arranged in rows and columns, each of said pixels being bounded by at least one data line and at least two control lines connected to a scanning control circuit, and each of said pixels including at least two pixel electrodes and at least two switching means, a first one of said pixel electrodes being connected to said at least one data line via a first one of said switching means, said first one of said switching means having a control input thereof connected to a first one of said control lines for receiving a first scanning pulse from said scanning control circuit for transferring charge on said first one of said pixel electrodes to said at least one data line, a second one of said pixel electrodes being connected to said first one of said pixel electrodes via a second one of said switching means, said second one of said switching means having a control input thereof connected to a second one of said control lines for receiving a second scanning pulse from said control circuit for transferring charge on said second one of said pixel electrodes to said first one of said pixel electrodes after said charge on said first one of said pixel electrodes has been transferred to said at least one data line, the method comprising the steps of:

a) scanning successive ones of said control lines such that for each of said pixels charge carried by said first one of said pixel electrodes is transferred to said at least one data line in response to scanning said first one of said at least two control lines, and charge carried by said second one of said pixel electrodes is redistributed to both said first one of said pixel electrodes and said second one of said pixel electrodes in response to scanning said second one of said control lines; and b) scanning successive adjacent pairs of said control lines a second time such that all remaining charge on said first and second ones of said pixel electrodes is transferred to said at least one data line.

* * * * *